United States Patent
Lewis et al.

[11] 3,803,609
[45] Apr. 9, 1974

[54] METHOD AND SYSTEM FOR RADIO MAPPING NOISE SOURCES IN CLOUDS

[76] Inventors: Edward A. Lewis, Bolton Rd., Harvard, Mass. 01451; Richard B. Harvey, 50 Timberneck Dr., Reading, Mass. 01867; Richard R. Reed, 93 B. Scott Cir., Bedford, Mass. 01730

[22] Filed: Apr. 18, 1972

[21] Appl. No.: 245,224

[52] U.S. Cl. .......................... 343/100 ME, 343/5 W
[51] Int. Cl. .............................................. G01s 9/60
[58] Field of Search......... 343/100 ME, 5 CM, 5 W, 343/5 MM

[56] References Cited
UNITED STATES PATENTS
| | | | |
|---|---|---|---|
| 3,287,726 | 11/1966 | Atlas................................. | 343/5 W |
| 3,134,902 | 5/1964 | Chase et al.................. | 250/83.3 HP |
| 2,995,740 | 8/1961 | Shreckengost.................. | 343/5 MM |
| 3,419,860 | 12/1968 | Helber et al..................... | 343/5 MM |

OTHER PUBLICATIONS
I.B.M. Technical Disclosure Bulletin, Vol 6, No. 7, December 1963. "Satellite Radiometer System", by N. W. Woodrick.

Primary Examiner—Maynard R. Wilbur
Assistant Examiner—T. M. Blum

[57] ABSTRACT

A method and system for radio mapping noise sources in clouds wherein there is remotely detected and displayed in pictorial, or other form, radio noise emission from clouds. When the electrification from natural meteorological processes in a cloud builds up, faint bursts of radio energy are emitted in the VHF, UHF, and SHF regions. These bursts are received with one or more directional antennas and the bursts are processed into useable signals, and are displayed in graphic, tabular, or model form. The clouds of interest are scanned by changing the direction of the antenna axis in a programmed manner, and the display is coupled to the antenna scan so as to produce a picture map, or "electrograph" similar to a television picture.

2 Claims, 13 Drawing Figures

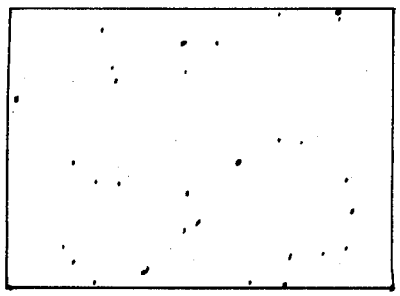
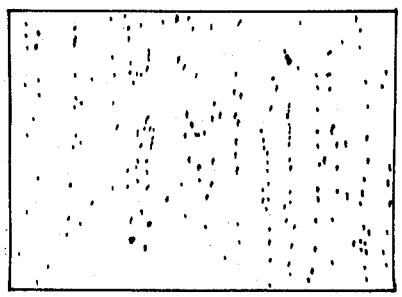
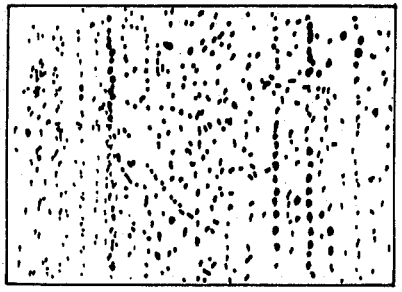
AZIMUTH: 210°
FREQUENCY: 250 MHz
BANDWIDTH: 500 KHz
PARABOLIC ANT BEAM: 15°
FIG.7

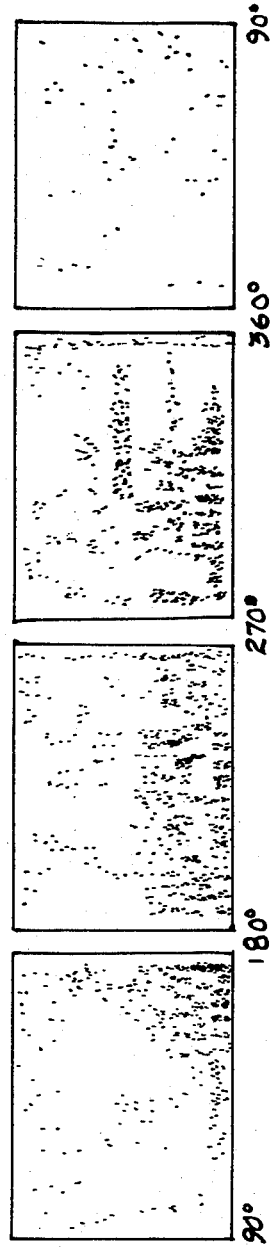
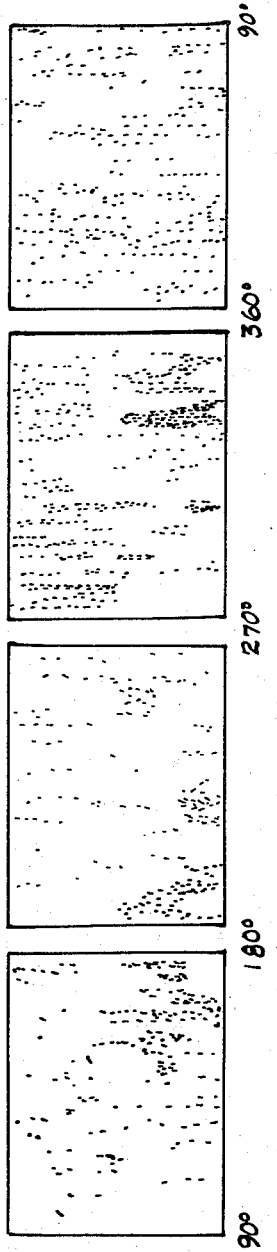
FIG. 10

1840 EDT
62-½° —
10° —
270°   360°
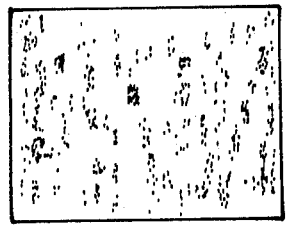
1850 E
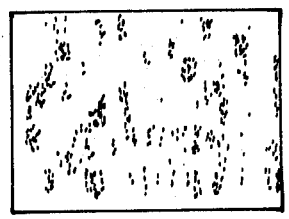
1900 E
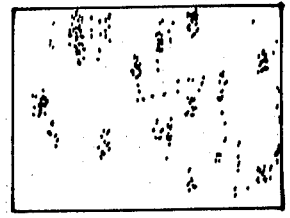
1920 EDT
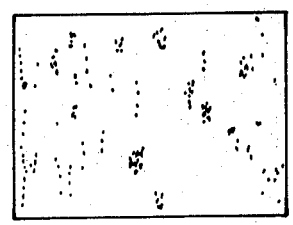
AZIMUTH: 270°–360°
ELEVATION: 10°–62-½°
7-½° STEPS
FIG. 11

METHOD AND SYSTEM FOR RADIO MAPPING NOISE SOURCES IN CLOUDS

BACKGROUND OF THE INVENTION

The prior art includes numerous methods and techniques in detecting the formation of storms including procedures for tracking, and forecasting their movement. To assist in storm detecting, the meteorologist has developed a number of special tools to supplement the usual surface and upper-air charts and analyses, routine meteorological observations, and the reports or visual observations from cooperative storm warning networks. Radar has been commonly used for detection and tracking of thunderstorms, squall lines, and tornadoes.

Radars have been utilized that analyze the return echoes from water particles contained in clouds to determine the degree and magnitude of storm intensity. Thus, the analysis of clouds becomes an important tool. The prior art in determination of cloud characteristics include conventional methods based on field null techniques and are primarily for local use. The results thereof are ambiguous or questionable. Accordingly, there exists a need for a reliable method and system capable of determining characteristics of clouds in order to provide significant information as to meteorological conditions.

The present invention is based upon the fact that atmospheric clouds sometimes emit radio noise at frequencies above 30 MHz. The characteristics of this radio noise and the distribution of its sources with the clouds have remained obscure. A portion of this radio noise might not be directly associated with overt lightning flashes, but might even precede the flashes by times long enough to be of interest for certain lightning warning applications. Furthermore, if this radio noise originates in small scale electrical discharges, it might well consist of a series of very short individual impulses, in which case its detectability could be enhanced by wide frequency-bandwidth signal processing. If the noise were detectable at high frequencies, the use of the proper antennas might give beamwidth narrow enough to localize the emissions within the cloud. Thus in accordance with the foregoing, the present invention utilizes directional antennas to passively detect radio noise emitted by clouds in a preselected spectral range (preferably 100 to 1000 MHz.). With the antenna programmed to automatically raster-scan an area of the sky, a slaved display provides a picture or map of the electrical activity.

The picture or map of the radio noise emission from a cloud or clouds of interest are distinctive and uniquely present a pattern of information to provide advance warning of thunderstorm buildup thus minimizing or eliminating lightning hazard generally and also specifically to aircraft on the ground and in flight, to rocket vehicles on the ground, or in launch or recovery phases of flight, to hazardous operations such as fueling or handling explosives. In addition to the foregoing, the invention provides more detailed and meteorological information assisting in routine weather forecasts. It also makes possible the warning of possible tornadoes and the tracking thereof, particularly since tornado electrographs have characteristic radio noise emission identifying features. It is especially noted that electrical warning will save lives of personnel working around communications, antennas, system complexes, and temporary systems with interconnecting wire laid out over poorly conducting ground which is particularly vulnerable.

SUMMARY OF THE INVENTION

A method and system for radio mapping noise sources in clouds is provided. When electrification in clouds builds up, bursts of radio energy are emitted. These bursts are generally in the form of radio noise emission. There are or may be a multiplicity of radio noise emission source in the cloud or clouds of interest in accordance with the intensity of meteorological conditions. The radio emissions are received by using one or more antennas. With the antenna or antennas programmed to automatically raster-scan an area of sky, a shared display in conjunction with the antenna provides a picture or map of the electrical activity.

Pictures or maps can be made with the scanning antenna fitted for the reception of cloud emissions in either vertical or horizontal polarizations, or various combinations, preferably simultaneously. By comparing the intensities, and/or frequency of the emissions in different polarizations the directions of the electric fields in the clouds may be established.

An object of the invention is to provide a method and system for radio mapping noise sources in clouds to identify a variety of meteorological conditions.

Another object of the invention is to provide a method and system for radio mapping noise sources in clouds in order to warn of approaching storms.

Yet another object of the invention is to provide a method and system for radio mapping noise sources in clouds to identify an approaching tornado.

Still another object of the invention is to provide a method and system for radio mapping of noise sources in clouds to warn of hazards resulting from lightning activities.

DESCRIPTION OF THE DRAWINGS

FIG. 7 shows a fourth group of sample-mode displays for three elevation angles in sequence;

FIG. 10 shows time sequence of high angle panoramic scan-mode displays;

FIG. 11 shows time sequence of high angle scan-mode displays related to the group shown in FIG. 9.

Figure 1:
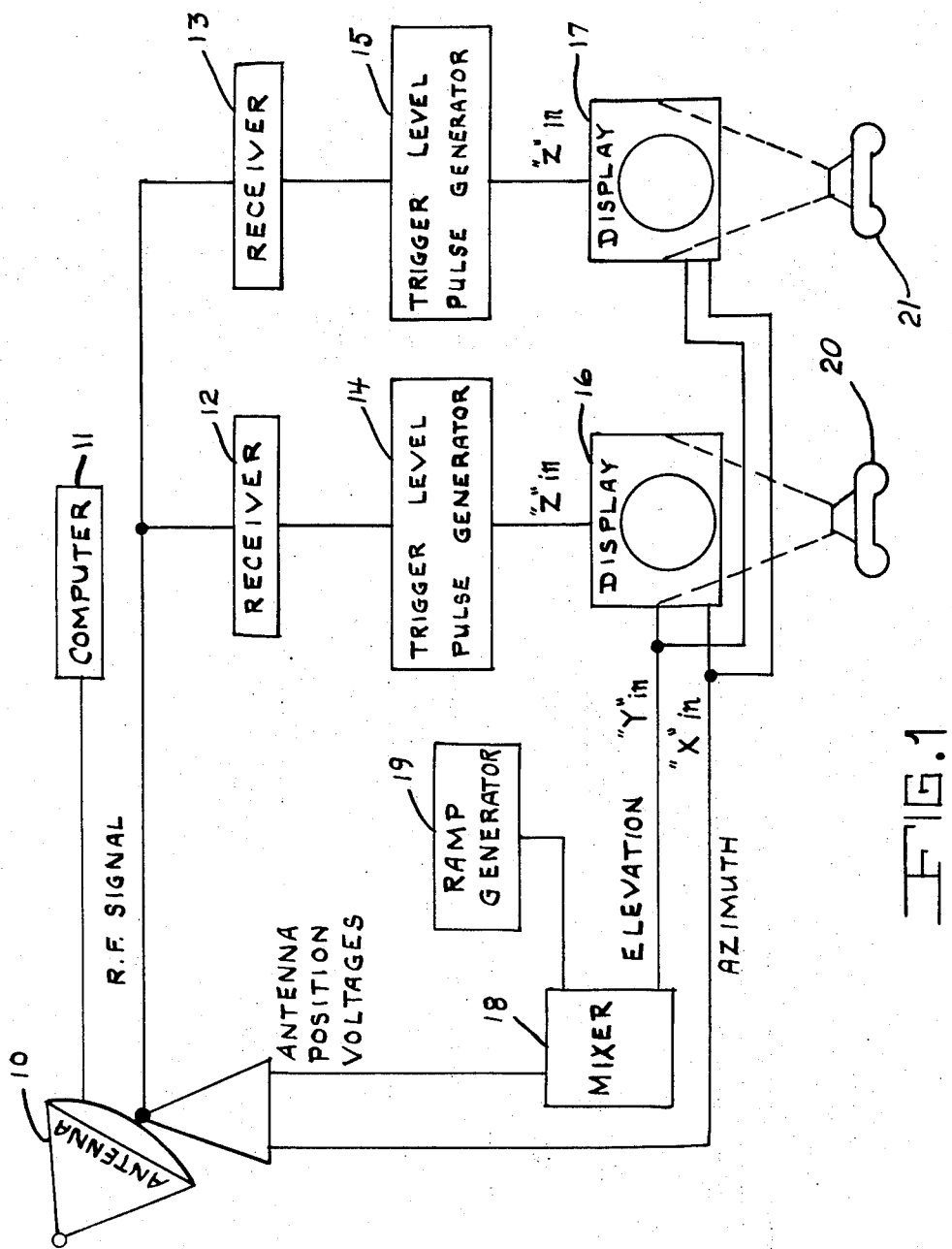
FIG. 1 shows in block diagram form a preferred embodiment of the invention.

Now referring in detail to FIG. 1, there is shown narrow beam antenna 10 which is programmed to automatically raster-scan an area of sky including clouds by conventional computer 11. It is noted that antenna 10 is capable of receiving both horizontally and vertically polarized waves and may include independent outputs for horizontal and vertical wave polarizations. In one instance a nineteen foot parabolic antenna with a log periodic feed was used and in another instance a quadruple rod and disc antenna. The log periodic feed covered 100 to 1000 MHz. The parabola gave the antenna a beam angle of 4° at 900 MHz. The rod and disc array covered 215 to 260 MHz with a 16° beamwidth. Both antennas could be directed manually, or programmed to scan automatically in azimuth and elevation as desired.

Figure 2:
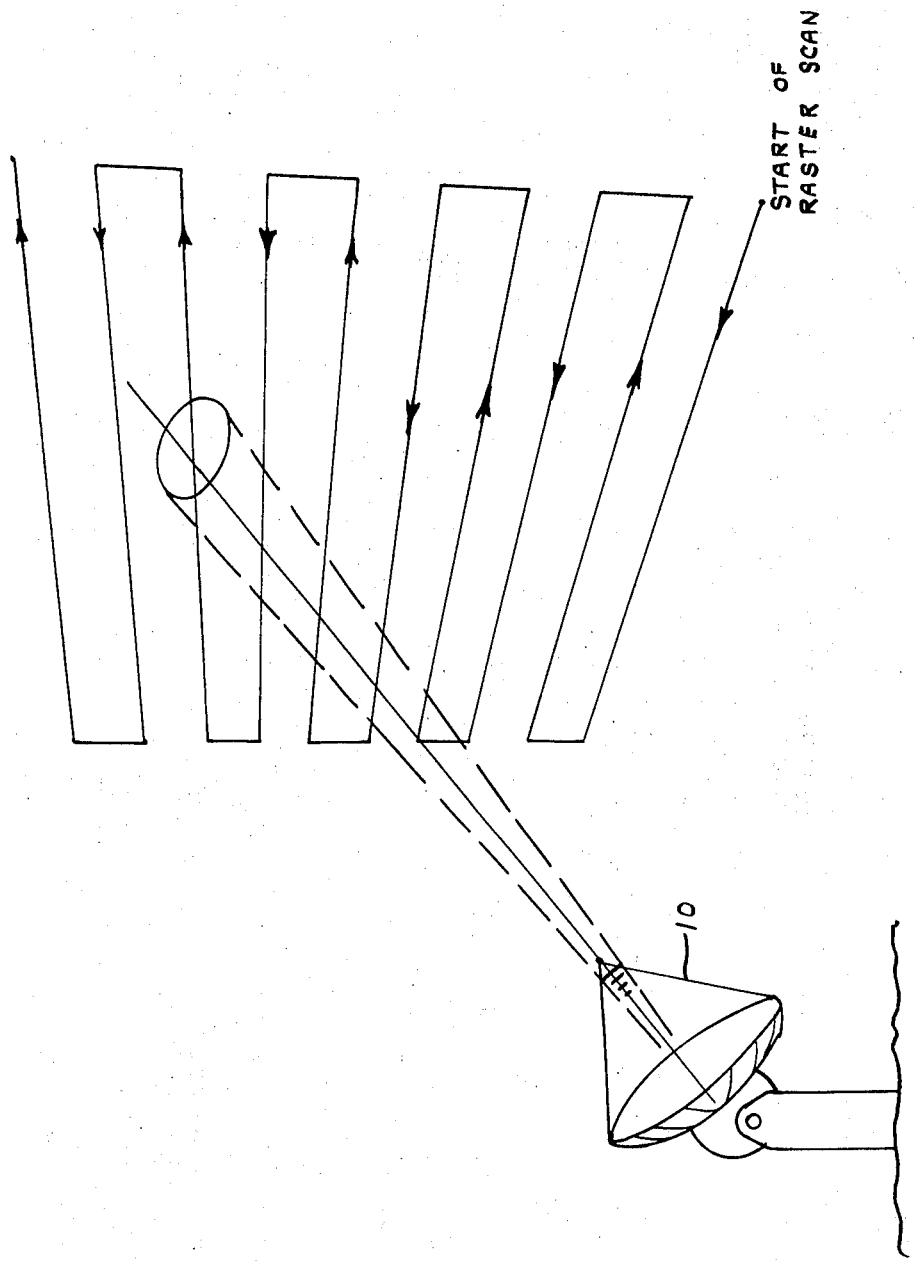
FIG. 2 shows the antenna of FIG. 1 sweeping a coarse raster scan in the sky.

Computer 11 is typically programmed to sweep out by means of antenna 10 a raster-scan in azumuth and direction as illustrated in FIG. 2, covering a selected region of the sky. The horizontal sweep, in this instance, was 90° in azimuth, and repeated by 3° of elevation so that 10 scans covered a vertical span of 30°. It is noted that antenna 10 can be raster-scanned 360° in azimuth or any preselected portion thereof in order to receive noise signals originating in a cloud or clouds of interest, the received signals having a direct relationship with the type and intensity of activity in the clouds.

Antenna 10 provides a pair of output antenna DC position voltages in the conventional fashion one representative of the azimuth angle and the other of the elevation angle. The varying voltage representative of the varying azimuth angle is fed to the X-positions of displays 16 and 17. The varying DC voltage representative of the varying elevation angle is fed to Y-positions of displays 16 and 17 by way of mixer 18. The operation of mixer 18 will be described in conjunction with ramp generator hereinafter. Displays 16 and 17 are of the oscilloscope type with a memory screen and are conventional and may be such as Storage Display Unit No. 601, manufactured by Tektronix, Inc. The Y-position of the oscilloscope beam is locked to the azimuthal position of antenna 10, and the Y-position is similarly locked to the elevation angle of antenna 10. Thus when antenna 10 sweeps its raster, the oscilloscope beam follows a corresponding slave raster. It is noted that the display may include conventional means other than an oscilloscope.

Receivers 12 and 13 simultaneously receive radio frequency signals from antenna 10. Receiver 12 tunes either of two ranges 90 to 300 MHz with a 6.5 db noise figure, or 470 to 1000 MHz with a 12 db noise figure. In both frequency ranges an IF bandwidth of 0.5 or 4.0 MHz can be selected, and in either case the receiver has a low impedance video (20 Hz to 4 MHz) output. Receiver 13 has two identical channels which can tune 215 to 260 MHz with a fixed IF band of 0.5 MHz. This receiver has low impedance video (20 Hz to 0.5 MHz) outputs. Generally it is highly desirable to have wideband circuitry (for example, 4 MHz) because emissions from clouds are of extremely short duration, and their average power is low. Narrow band equipment may degrade the information content of the emissions.

Video output pulse signals from receivers 12 and 13 are fed to trigger level pulse generators 14 and 15, respectively. Pulse generators 14 and 15 have an adjustable threshold which is preset (generally) to a level slightly above receiver noise amplitude. Each time this preset threshold is exceeded by an incoming video pulse, a representative 10 μsec flat-top output pulse is provided from the pulse generator. Trigger level pulse generators 14 and 15 are conventional and may be of the Schmitt trigger circuit type.

The 10 μsec output pulses from trigger level pulse generators 14 and 15 are applied to the Z, or intensity axis, of displays 16 and 17, respectively, thus producing representative bright dots on the memory screens. The storage feature of the memory screen allows the display to be examined visually and/or recorded photographically by cameras 20 and 21. The cameras provide display photos which may be taken in azimuthal sequence.

Figure 3:
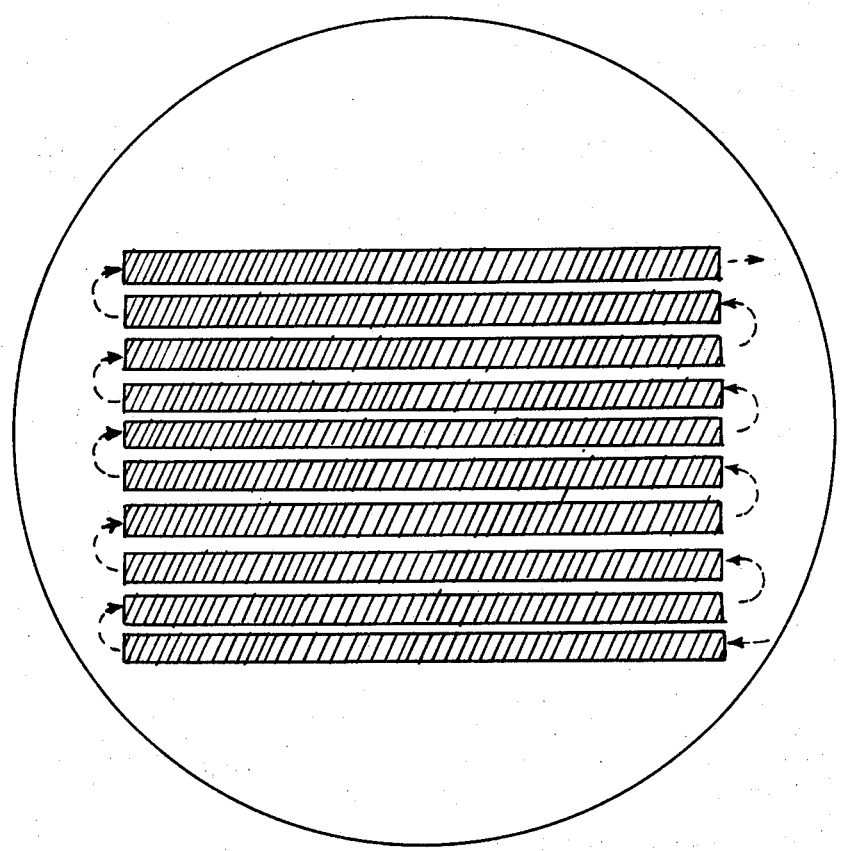
FIG. 3 shows the coarse raster scan of FIG. 2 which has been filled.

The X-Y positions of the beam of a display may be controlled in two ways, depending upon whether the antenna is pointed in a fixed direction (sample-mode) or programmed to scan (scan-mode). In order to keep the signal indications from being superimposed at one point on the screen in the sample-mode, the beam may be deflected with a 20 μsec sawtooth on the X-axis and a 60 μsec sawtooth on the Y-axis. Thus a complete frame, representing one data sample, requires one minute to make, and can be held for inspection or photographing and then erased to take a new sample. In the scan-mode the X and Y positions of the beam are slaved to the azimuth and elevation of the antenna by position voltages. Typically, the antenna requires 36 seconds to sweep in azimuth over a 90° sector, after which it quickly changes elevation by a programmed amount (3° or 7½°) and then swept the same azimuthal sector in the reverse direction. Correspondingly, the beam position in the display would trace out a coarse raster, with a close superposition of signal indications. To avoid this superposition, an additional 20 μsec sawtooth voltage from ramp generator 19 is applied to the Y-axis by way of mixer 18, with sufficient amplitude to fill in the spaces between the lines of the coarse raster of FIG. 2. The filled-in spaces are shown in FIG. 3. Depending on the number of elevation steps, 3 to 6 minutes is required to produce one from in the scan-mode. It is noted that electronic scan may also be utilized in which the time required to produce one frame would be substantially reduced.

If the number density of signal sources per second unit solid angle were constant over the sky, the number density of signal indications per square centimeter would be practically constant over the display frame. On the other hand, since a portion of the sky bounded by curvilinear lines is being mapped on a flat rectangular display, some geometric distortion is entailed. For example, if a 60° range of elevator angles is being covered, the difference in horizontal scale from top to bottom of the display is about 2 to 1.

Figure 4:
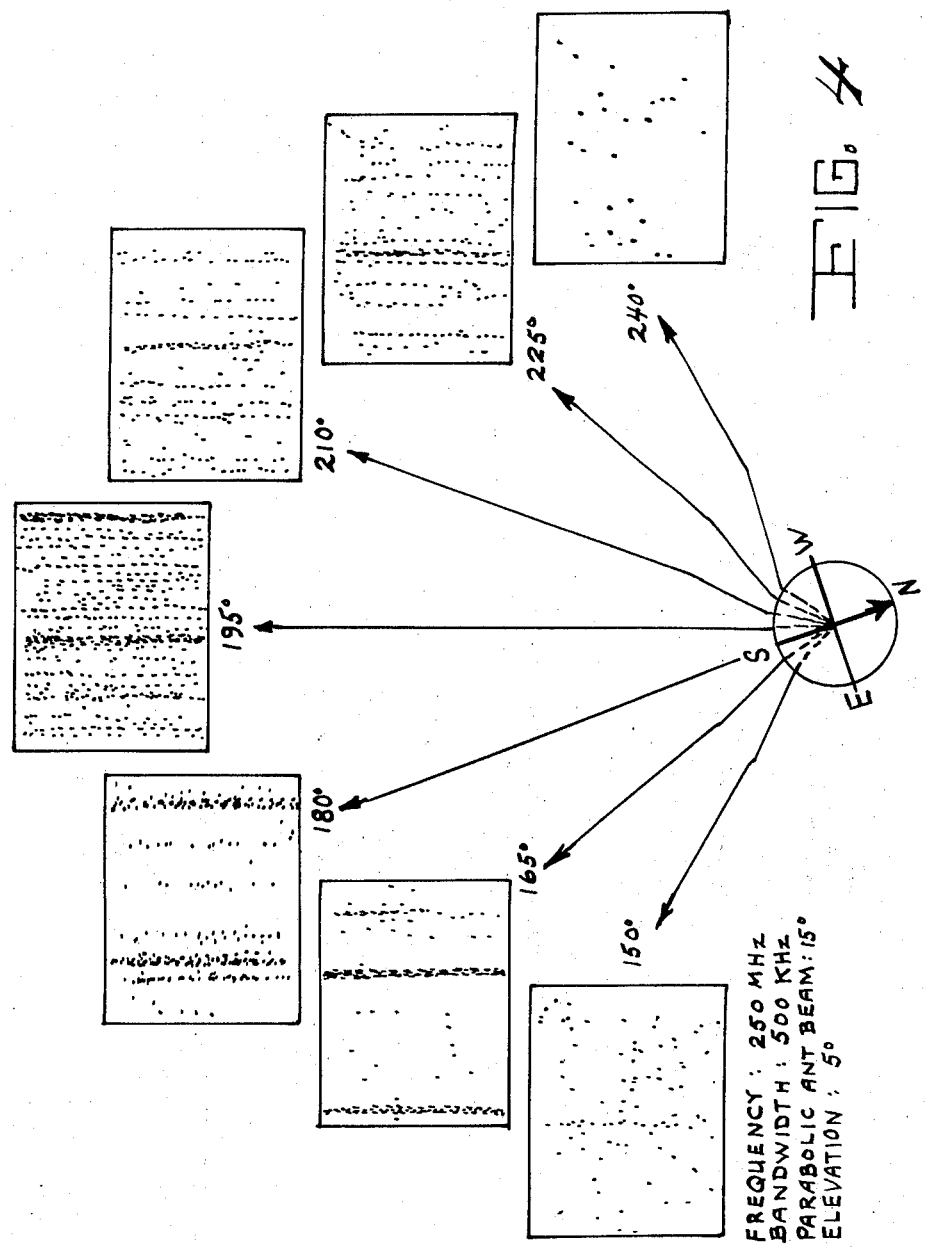
FIG. 4 shows one group of time sequence azimuthal sample-mode display photographs.

FIG. 4 shows sample-mode display photos taken one after the other within 12 minutes (1627 to 1639 EDT, 17 Aug. 1971). The antenna beamwidth was 15°, the antenna axis had an elevation of 5°, and the displays indicated the noise coming from seven directions in a 90° sector of the horizon. The sample for azimuth 195° shows the greatest activity. At about this time an aircraft reported a thunderstorm about 10 miles southwest of Patrick Air Force Base, which would place it about 30 miles from the antenna at approximately 190° azimuth. This information agrees quite well with the radio noise observations.

Figure 5:
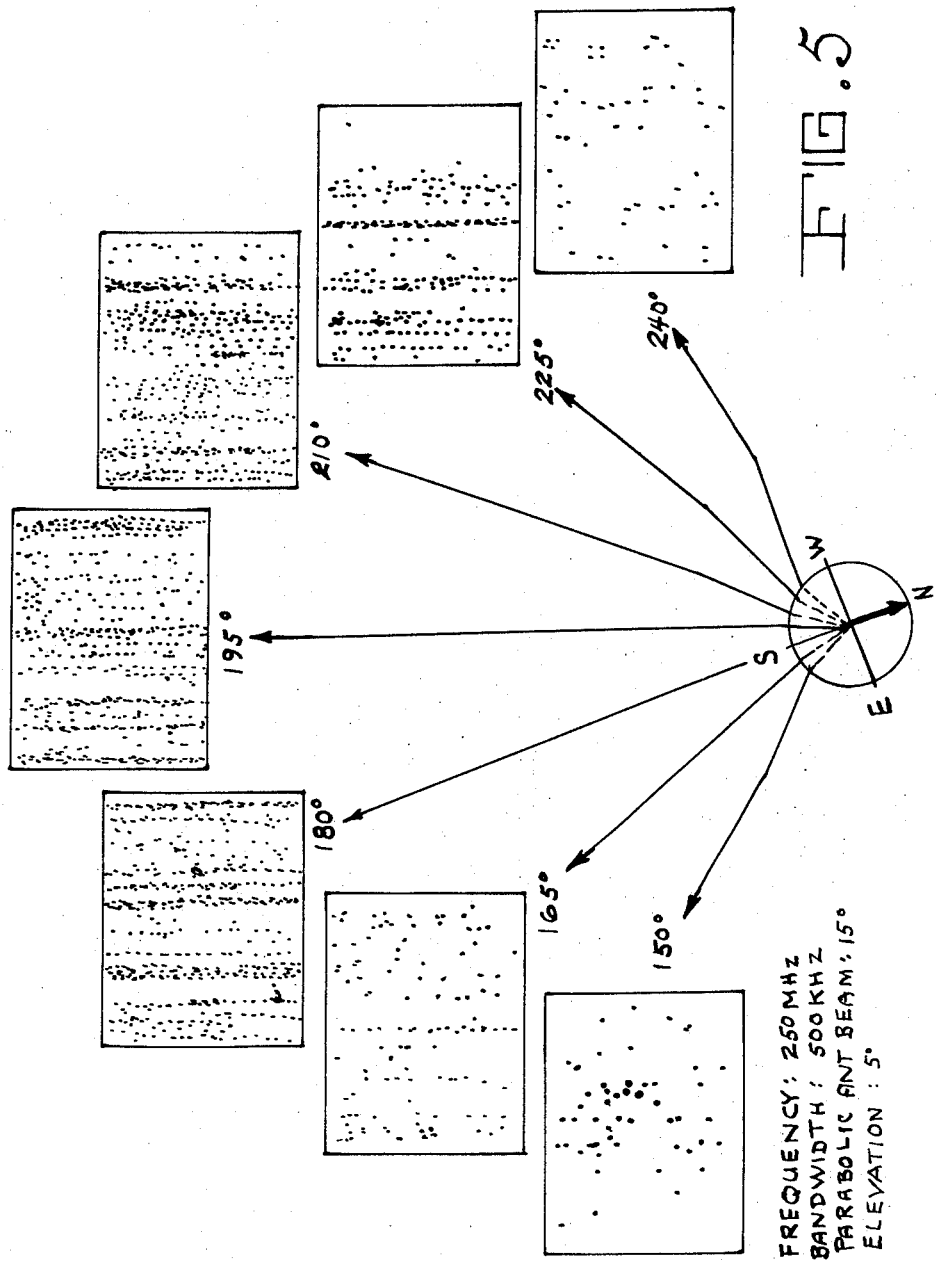
FIG. 5 shows a second group of time sequence azimuthal sample-mode display photographs.
Figure 6:
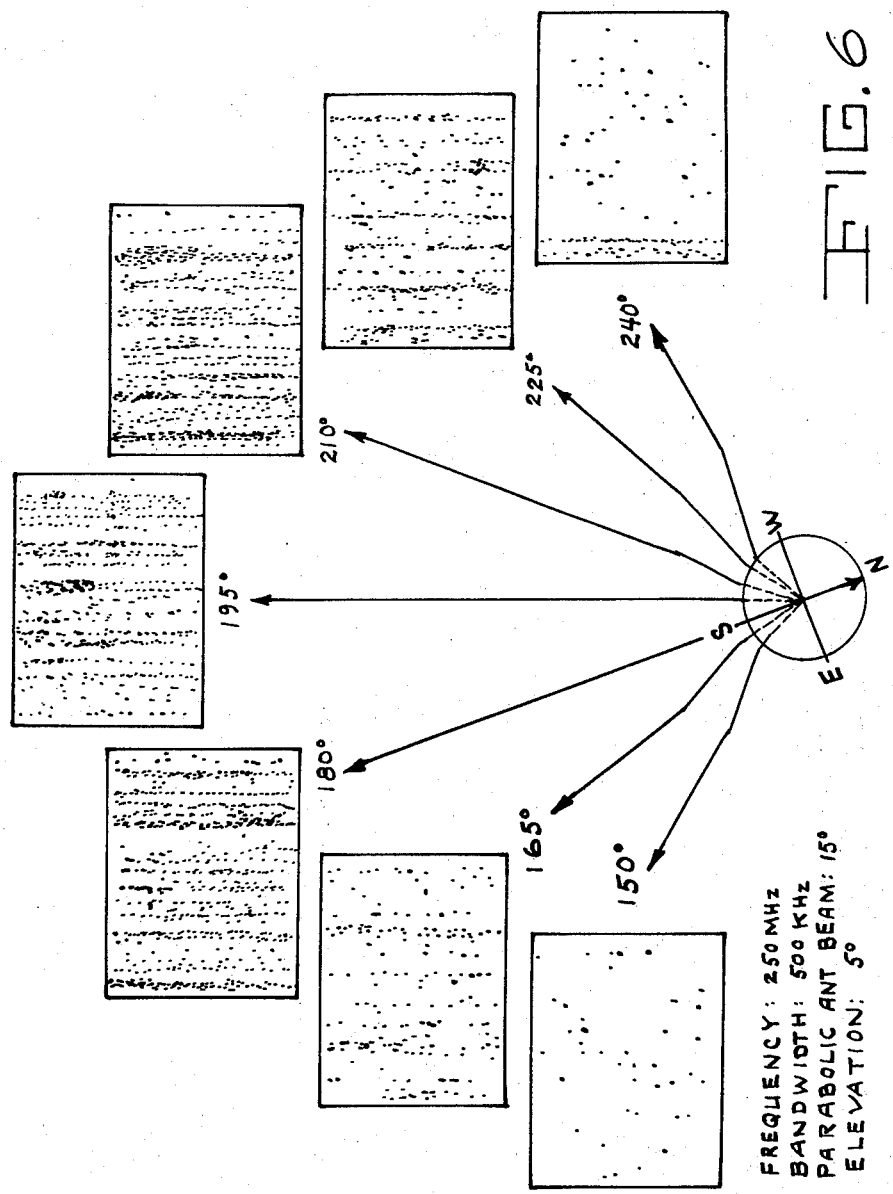
FIG. 6 shows a third group of time sequence azimuthal sample-mode display photographs.

The corresponding pictures obtained approximately a half-hour later are given in FIG. 5. These indicate that the activity then spread from 180° to 210°. FIG. 6 gives the results after another half-hour (1722 to 1733), when the intense activity extended from 180° to 225°, with a maximum around 210°. The increasing azimuthal angle suggests the thunderstorm drifted westward.

FIG. 7 presents pictures from the 210° azimuth for three elevation angles near the horizon. When the 15° antenna beam was used the noise was largely gone at 15° elevation. It appears that the radio noise was mainly confined to elevation angles between 0° and 7½°, which corresponds to an altitude from about 600 to 21,000 feet at 30 miles of great circle range.

Figure 8A:
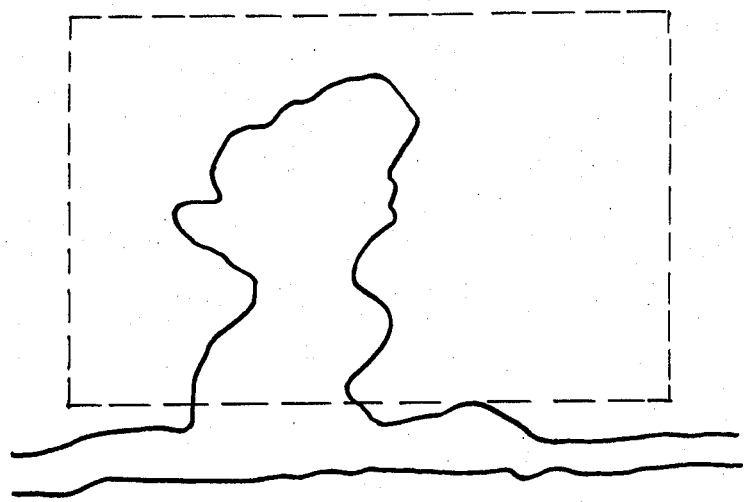
FIG. 8a shows an outline of a visible single cloud.
Figure 8B:
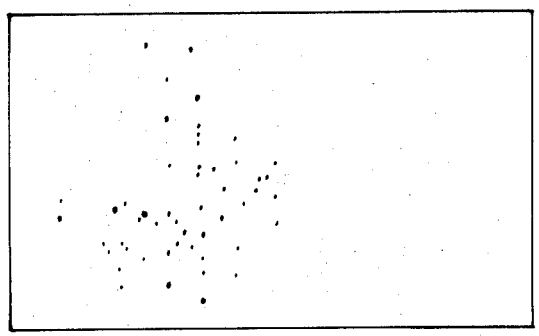
FIG. 8b shows a photographic display of the single cloud of FIG. 8a taken from the display face.

While the radio noise was typically distributed over a wide sector, as in the example just discussed, there were occasional cases when a single cloud appearing alone in the sky showed electrification. FIG. 8A shows the visual appearance of such a cloud from a pencil sketch. This cloud was about 8 miles away, and its top was probably at about 15,000 feet. FIG. 8B shows a photo display from the face of the oscilloscope representative of the single cloud of FIG. 8A.

The radio antenna scanned a sector of the sky containing the cloud using manual control instead of the automatic control used on subsequent examples. The frequency (920 MHz) was higher than heretofore, and the beamwidth (4°) was consequently narrower.

It can be seen that the noise-pulse indications tend to cluster in the vicinity of the cloud. Fifteen minutes later the noise had disappeared, visual inspection showed that the top of the cloud no longer had a sharp outline, and the cloud itself began to break up and dissipate.

Figure 9:
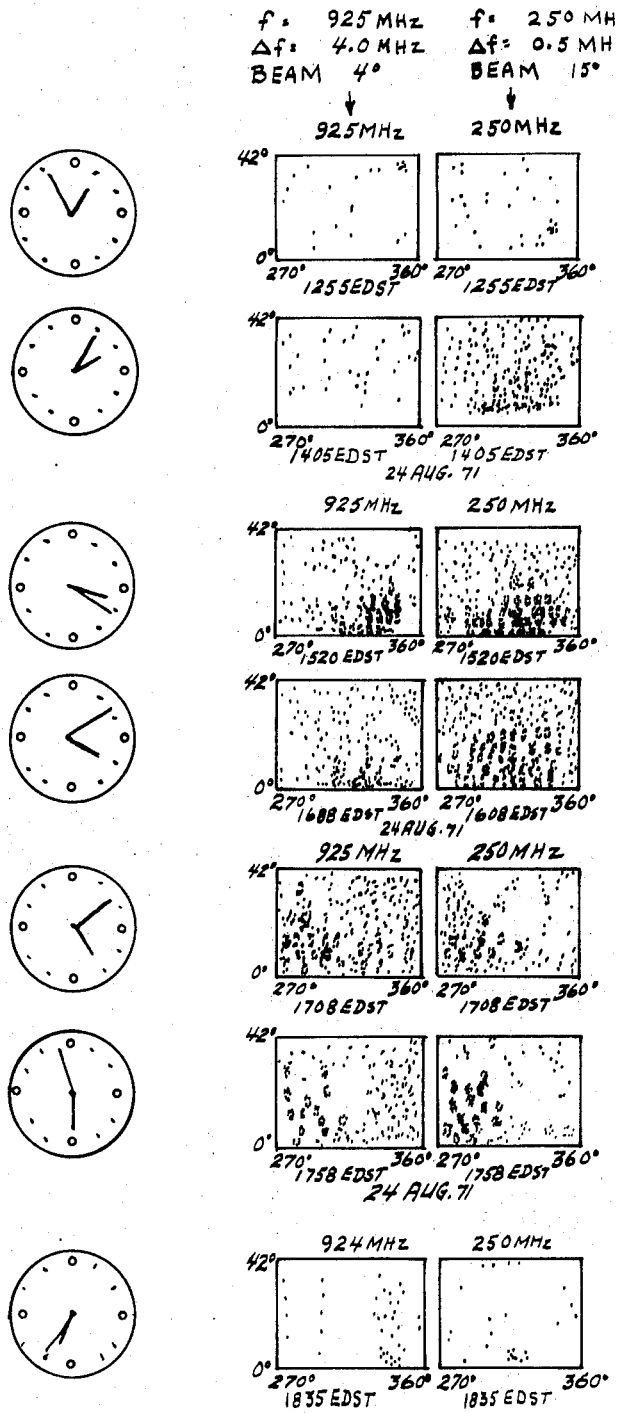
FIG. 9 shows a time sequence of scan-mode displays at two different frequencies.

FIG. 9 shows scan-mode displays of one area of the sky (Azimuth Sector 270° to 360°; Elevation Sector 0° to 42°) made with the nineteen-foot parabolic antenna which was programmed to automatically scan with 3° elevation steps between azimuthal sweeps. Two frequencies, 925 MHz and 250 MHz with 4° and 15° beamwidths, were received simultaneously, on the vertical and horizontal polarized antenna feeds respectively. Previous tests at 250 MHz had shown that the noise signals were received with about the same rates and amplitudes on the two polarizations so that the displays shown in pairs in FIG. 9 permit a comparison of results with two combinations of frequency and antenna beamwidths. The display pairs were made at roughly one-hour intervals over a period of 5 hours and 40 minutes. Starting at 1255 EDT activity in the sector was very light, reached a maximum around 1520, and was largely gone by 1835.

At 1708, and at 1758, the pictures at the two frequencies were very similar; whereas, with no change in gain settings, the pictures at 1405 and 1520, for example, showed much more activity on the lower frequency. The character of the received noise therefore can be said to have changed with time, but whether this was due to changes in the actual emissions, or due to some other cause such as movement of the storm, is not known. Displays of both frequencies show a gradual movement of the intensity maxima from an azimuth of about 325° at 1520, to around 285° at 1758. At 1700 EDT there was very heavy thunderstorm activity passing in an easterly direction over McCoy Air Force Base at Orlando, at about 42 miles and 272° azimuth from the antenna. This storm was probably the source of the radio noise, but there may also have been contributions from storms even further away.

In FIG. 9 the records show both small white dots and larger white bars indicating the coalescence of many dots. In a number of cases these bars were observed to coincide with the occurrence of visible lightning, but since the bars sometimes occur at higher rates (one every three seconds in the 250 MHz display at 1608, for example) every bar may not represent a lightning flash. The individual bars commonly have a duration of 1.5 sec or more. The display of the single cloud (FIG. 8B) shows no bars and no lightning was seen at the time. Evidently the electrification detected with the antenna did not build up to the point of producing lightning before the cloud dissipated.

If the display triggering threshold is set too low, it may be exceeded by radiation pulses from the spark ignition systems of gasoline engines operating in the vicinity of the antenna. Because of the quasi-constant repetition rate of these pulses, however, they can generally be recognized from the coherent patterns they produce in the display. A slight amount of ignition interference can be seen in the lower left corner of the 250 MHz display at 1608 in FIG. 9.

On August 27, data was recorded with the quadruple rod and disk antenna since the parabolic antenna was not available. The independent outputs for horizontal and vertical wave polarizations were used with the dual channel receiver aforementioned to make simultaneous scan-mode displays with the two polarizations. These pictures were almost identical in appearance as would be expected if the noise bursts were randomly polarized.

Starting at 1515 EDT scan-mode displays (FIG. 10, Part 1) were made of the entire horizon, quadrant by quadrant. These show noise coming from the azimuthal sector 150° to 340°. (Ignition noise from a nearby automobile was briefly picked up on a sidelobe of the antenna, and appeared at elevation angle of about 24° at azimuths from 290° to 340°). FIG. 9 shows a similar run made about 2 hours later with a slightly different scan program and somewhat less sensitivity. This showed a concentration of noise in the 270° to 360° azimuthal sector, which did not decrease with increasing elevation angle in the usual manner. The antenna program was then changed to cover the same sector with higher elevation angles (10° to 62½°). A time sequence of records, shown in FIG. 11, was made until the activity was nearly over at 1920 EDT. The pictures suggest that the activity probably extended well above 62½° elevation.

During this sequence, the operators noted storm clouds extending westward from a north-south line with lightning activity toward the west. Later it was learned that there was a violent thunderstorm directly over Titusville during which, at about 1830 EDT, a tornado touched down about nine and one-half miles from the antenna at azimuth 290°. This tornado caused some slight property damage and a local resident stated that it was accompanied by a by a whitish light, which is reminiscent of accounts of other tornadoes discussed by Vonnegut and Moore (1959), for example. The tornado struck after the 1720 to 1800 display of FIG. 10 and shortly before the 1840 record of FIG. 11. If the radio noise indicated at 60° elevation came from the Titusville storm, the noise emitters would have to have been at altitudes in excess of 80,000 feet, which seems high even for a tornado-thunderstorm. Since these preliminary experiments lacked the equipment necessary to triangulate on the noise sources, the actual altitudes are somewhat uncertain.

During the observing period some 600 display-photos were taken at various frequencies and conditions of operation. Some hours were spent on different days and different frequencies, some as low as 112 MHz, scanning sections of the sky containing no visible clouds, trying to determine if the radio noise emissions were observed. Time was also spent sampling visible clouds, most of which produced no radio noise. Clouds with visible lightning activity invariably showed noise, and were probably either developing toward the capacity to produce lightning, or were dissipating from a more active condition.

The amplitudes of the noise pulses were observed to increase when the bandwidth was increased from 0.5 MHz to 4 MHz tending qualitatively to confirm the idea that their individual durations were very brief. In these preliminary tests no attempt was made to establish quantitatively the magnitude of the impulses.

If there were discrete charge centers in the clouds it might be supposed that in the strong field region of space between them, the field would be predominantly in one direction, so that any small scale discharge might have a preferred direction, and hence radiate with a preferred polarization. If this is indeed the case, the preliminary polarization experiments were too crude to detect it.

It has been demonstrated that UHF/VHF noise emission from clouds consist of an irregular series of very short pulses, emitted over extended periods of time. The noise can be detected at ranges of 50 miles or more, and can be mapped in two dimensions with a directional antenna equipped to scan. In the case of a tornado-producing thunderstorm, some of the sources responsible for the noise appear to have been at very high altitudes. This technique could be an aid for storm tracking and warning purposes.

It is noted that where there exists two cloud systems with a separation therebetween, it is possible that the antenna beam passes through both cloud systems. The operator may not know which cloud is responsible if emissions are observed. In this case, a secondary antenna appropriately located perhaps 10-30 miles away connected with the primary antenna by a digital coincidence gate, would resolve the ambiguity. Coincident bursts would mean the emissions came from the second cloud system, while noncoincident bursts would indicate that the first cloud system was emitting signals. The emissions are so brief relative to their separation in time that the coincidence technique becomes very effective. This coincidence technique will also be valuable in the event the primary antenna is near a strong source of noise pulses, as for example, unshielded ignition systems.

Figure 12:
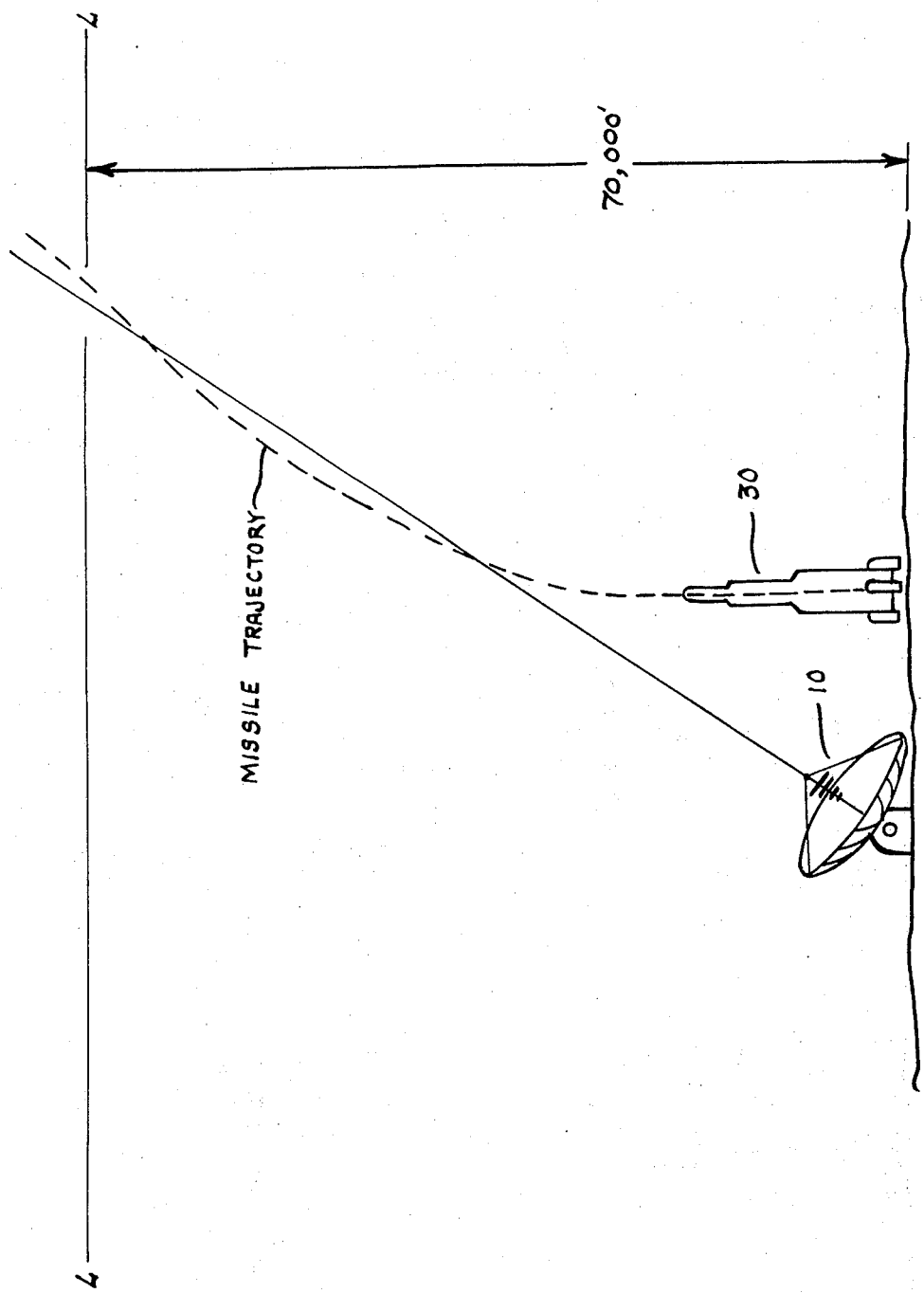
FIG. 12 shows a basic system for rocket launch warning.

Now referring to FIG. 12, rocket 30 is intended to be launched so as to follow the dotted-line trajectory. The rocket is vulnerable to lightning strokes, while it is between the ground, and some level L-L at approximately 70,000 feet which is above most thunderstorm activity. Antenna 10 near the ground, and aimed approximately along the missile trajectory, will detect the electrification of any dangerous clouds above the path. Antenna 10 is identical to the one shown in FIG. 1 and it is associated with the same components as in FIG. 1. For planning purposes and for operational convenience, it would be desirable to have antenna 10 also sweep out a cone of directions in the vicinity of the launch direction. In the event of the launch of the rocket under high field conditions causing detectable emissions, these would occur subsequent to lift off and would cause no confusion.

Instead of using one or more high gain antennas, a spaced, time-of-arrival of low gain, or even omnidirectional antennas could be used. The short pulse from a localized emission source propagates with a finite velocity nearly the same as for light waves, so that different antennas receive the pulse at slightly different times. The mathematical interpretation of these slight, but easily measured, time differences results in determining the directional, and/or spacial coordinates of the emission source. This mathematical calculation requires an electronic computer for speedy results, and the display can either be visual or model representation. The spaced array of small antennas lends itself to mobile or aircraft use better than one large directional antenna; for example, an aircraft or other vehicle so equipped could thereby avoid passing through or near electrified regions.

It is emphasized that an important use for the system shown in FIG. 1 is as a storm and lightning warning system for use on airborne objects such as airplanes, etc. Airplanes and helicopters can become highly charged by encountering strong electric fields in clouds. Their communications equipment can be knocked out or their control system can be damaged by subsequent discharges. Moreover, they become a prime target for a lightning stroke. The protection of aircraft and their electrical equipment from hazards of contact electrification is an exceedingly complex problem and is solved substantially by the inclusion of the system of this invention on airborne objects to provide prior warning of the intensity of electrical activity in a cloud or clouds prior to passing therethrough or nearby.

What is claimed is:

1. A system for mapping emitting radio noise sources in clouds of interest representative of the electrical activity therein to provide significant meteorological information relating to approaching tornadoes, storms and the like comprising ground based receiving antenna means only to raster scan clouds of interest to provide radio frequency signals representative of said electrical activity, said receiving antenna means simultaneously generating first and second signals representative of the varying horizontal and vertical positions, respectively, of said receiving antenna means, means to display said radio frequency signals in the form of a map representative of the electrical activity in the clouds of interest, said means to display being comprised of receiver means being fed radio frequency signals from said receiving antenna means, said receiver means having a predetermined frequency bandwidth and providing a video output pulse for each radio frequency signal fed thereto from said receiving antenna means, a threshold circuit receiving said video output pulse, said threshold circuit having a predetermined set level and providing a threshold output pulse for each received video output pulse above said set level, an oscilloscope having a memory screen, said oscilloscope having horizontal and vertical input terminals and an intensity input terminal, said horizontal and vertical input terminals receiving said first and second signals, respectively, and said intensity terminal receiving the threshold output pulses for intensity control purposes to provide a dot on said memory screen for each received threshold output pulse, means to synchronize said raster scan with said means to display, and means to superimpose a sawtooth signal of predetermined magnitude on said second signal prior to being fed to said oscilloscope.

2. A system for mapping emitting radio noise sources in clouds of interest representative of the electrical activity therein to provide significant meteorological information relating to approaching tornadoes, storms and the like comprising ground based receiving antenna means only to raster scan clouds of interest to provide radio frequency signals representative of said electrical activity, said receiving antenna means simultaneously generating first and second signals representative of the varying horizontal and vertical positions, respectively, of said receiving antenna means, means to display said radio frequency signals in the form of a map representative of the electrical activity in the clouds of interest, said means to display being comprised of a multiplicity of receiver means, each of said receiver means having a different predetermined frequency bandwidth and providing a video output pulse for each radio frequency signal fed thereto from said receiving antenna means, a threshold circuit for each of said receiver means, each of the threshold circuits having a predetermined magnitude level and providing a threshold output pulse for each received video output pulse above said predetermined magnitude level, an oscilloscope for each of said threshold circuits, each of said oscilloscopes having a memory screen and also horizontal, vertical, and intensity input terminals, each of said horizontal and vertical input terminals receiving said first and second signals, respectively, and each of said input intensity terminals receiving the threshold output pulse from its associated threshold circuit for intensity control purposes to provide a visible dot on the associated memory screen for each received threshold pulse, means to synchronize said raster scan with said means to display, and means to superimpose a sawtooth signal of predetermined magnitude on said second signal prior to being fed to each of said oscilloscopes.

* * * * *